TRANSFER CIRCUIT INCLUDING A PARAMETRIC AMPLIFIER

Filed July 15, 1963 5 Sheets-Sheet 1

April 16, 1968 K. SABBAN ET AL 3,378,640

TRANSFER CIRCUIT INCLUDING A PARAMETRIC AMPLIFIER

Filed July 15, 1963 5 Sheets-Sheet 5

United States Patent Office 3,378,640
Patented Apr. 16, 1968

3,378,640
TRANSFER CIRCUIT INCLUDING A PARAMETRIC AMPLIFIER

Klaus Sabban and Max Schlichte, Munich, Germany, assignors to Siemens Aktiengesellschaft, a corporation of Germany Filed July 15, 1963, Ser. No. 294,891
Claims priority, application Germany, July 19, 1962, S 80,489
8 Claims. (Cl. 179—15)

The invention disclosed herein relates to a transfer circuit including a parametric amplifier and may be considered as an improvement on the parametric amplifier described and claimed in copending application Ser. No. 249,982, filed Jan. 4, 1963, which is owned by the assignee named in the present case.

The present invention is particularly concerned with an amplifier for electric oscillations, wherein the signal oscillations which are to be amplified are by means of a sampling switch cooperating for substantially loss free sampling with a transfer reactance, transformed into a sequence of sampling signals, the sequence frequency of which corresponds to at least twice the highest signal frequency, and wherein the individual sampling signals are parametrically amplified with the aid of a pump oscillation.

The above noted copending application describes an amplifier for electric oscillations, employing an electric storer to which are conducted the oscillations which are to be amplified and from which they are obtained after being parametrically amplified (parametric amplifier). It is important in connection with the amplifier according to the copending application that an input storer for the oscillations which are to be amplified is disposed ahead of the parametric storer and connectible therewith by means of a first periodically operable switch while an output storer for the amplified oscillations is disposed following the parametric storer and connectible therewith by means of a second periodically operable switch, the switching frequency of both switches amounting to at least twice the highest frequency of the oscillations which are to be amplified, and the closure and opening instants of the switches being mutually displaced in time so as to obtain a flow of energy from the input storer by way of the parametric storer to the output storer. According to a further feature as shown in the seventh figure of the copending application, the parametric storer also forms the input- and/or the output storer, and the pump energy is supplied in the form of impulses which are short as compared with the period of the oscillations which are to be amplified, said impulses starting ahead of the transfer operation and ending shortly thereafter. Only a single sampling switch is required in such case.

A feature of the amplifier described in the copending application resides in that a resistance transformation occurs in the direction of transmission and that the amplification depends upon the direction of transmission.

An object of the present invention resides in further developing the prior arrangement particularly so as to make the amplification independent of the direction of transmission. The arrangement shall moreover permit to provide similar input- and output resistances so as to obtain symmetrical operation.

According to the invention, the above indicated objects are realized in connection with an amplifier of the initially indicated kind, by using for the pump operation transfer reactance of the sampling circuit.

Upon using in the longitudinal branch of the sampling four-terminal network an inductance disposed in series with the sampling switch, to act as transfer reactance, there is advantageously provided a separate magnetizing device for pumping the inductance. It is likewise advantageous, in the event of using a transfer reactance a capacitance disposed in the transverse branch in parallel to the sampling switch, to employ a separate electrical control device for pumping the capacitance.

As already noted in the copending application, the pump device is advantageously decoupled from the signal current circuit, and a sequence of impulses is employed as pump oscillation.

Further details and features of the invention will appear from the appended claims and from the description of embodiments thereof which is rendered below with reference to the accompanying drawings.

In the drawings:

FIG. 1 indicates an amplifier comprising a storer formed as a low pass filter at the terminal capacitance of which is to appear the signal voltage with an amplitude depending upon time, and having a signal transfer switch in the longitudinal branch;

FIGS. 2*a* and 2*d* show electrical and magnetic conditions;

Figure 6:
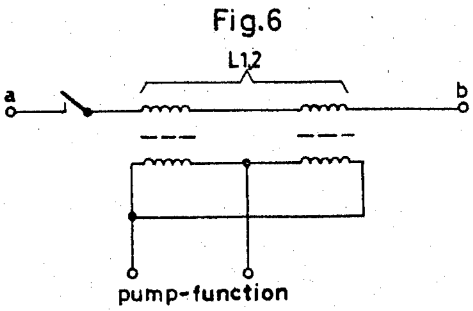
Figure 7:
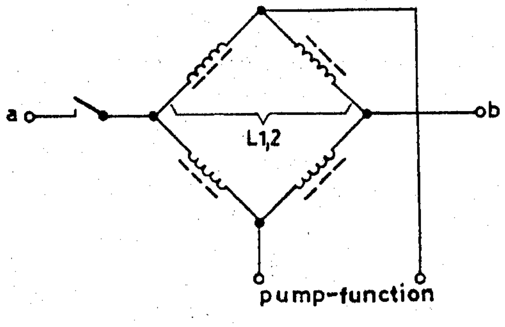
Figure 8:
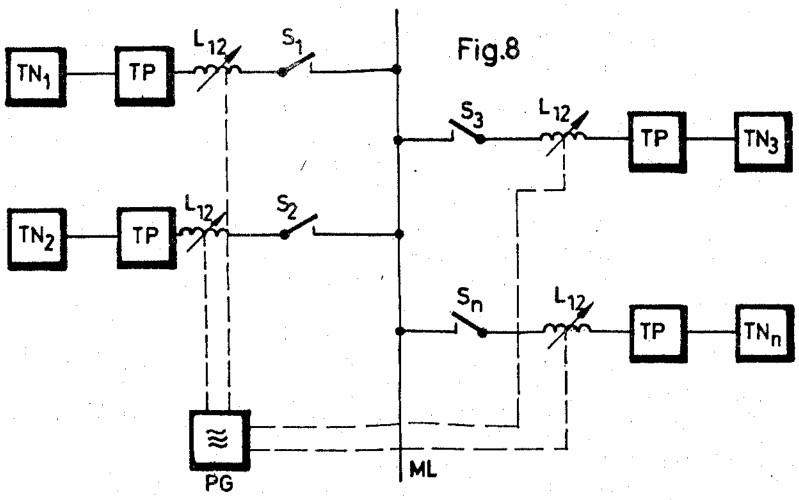
Figure 9:
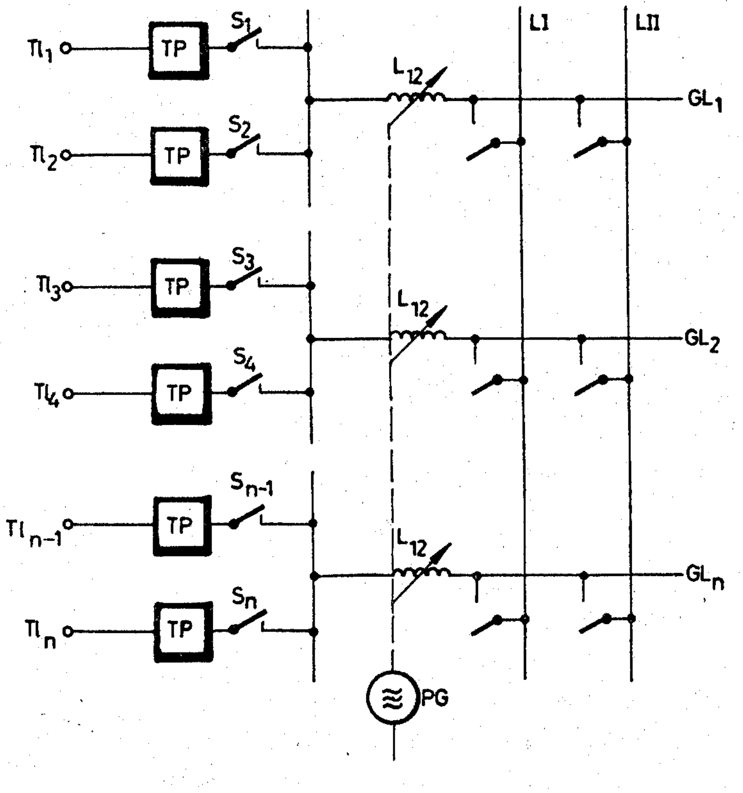
Figure 10:
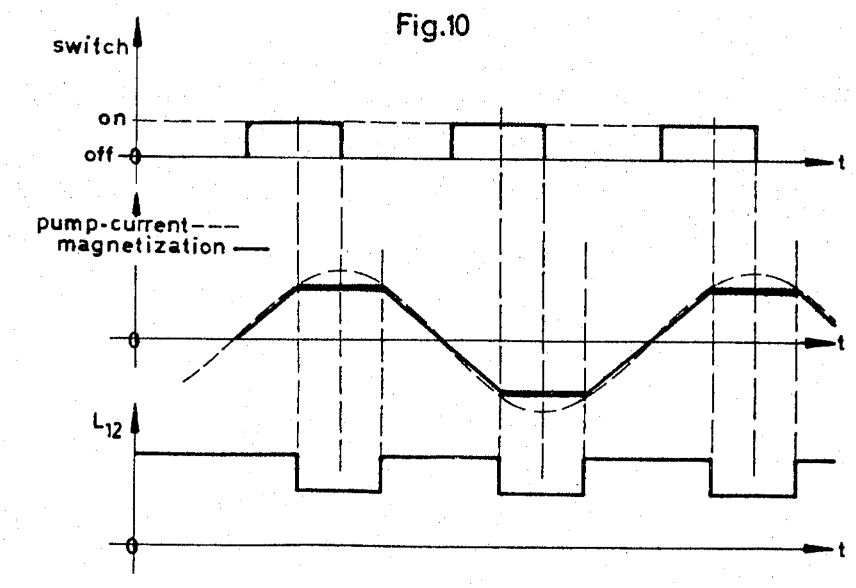

FIG. 6 indicates a circuit example employing a variable inductance comprising separate coils;

FIG. 7 represents a circuit example employing a variable inductance comprising four separate coils;

FIG. 8 shows the use of the invention in connection with a single stage time-division multiplex communication system;

FIG. 9 indicates a plural-stage system of this kind, in which a parametric amplifier is common to a plurality of subscriber lines; and FIG. 10 is a diagram illustrating the interrelation between sampling pulses and pump current magnetization.

Figures 1, 2A, 2B, 2C, 2D, 3:
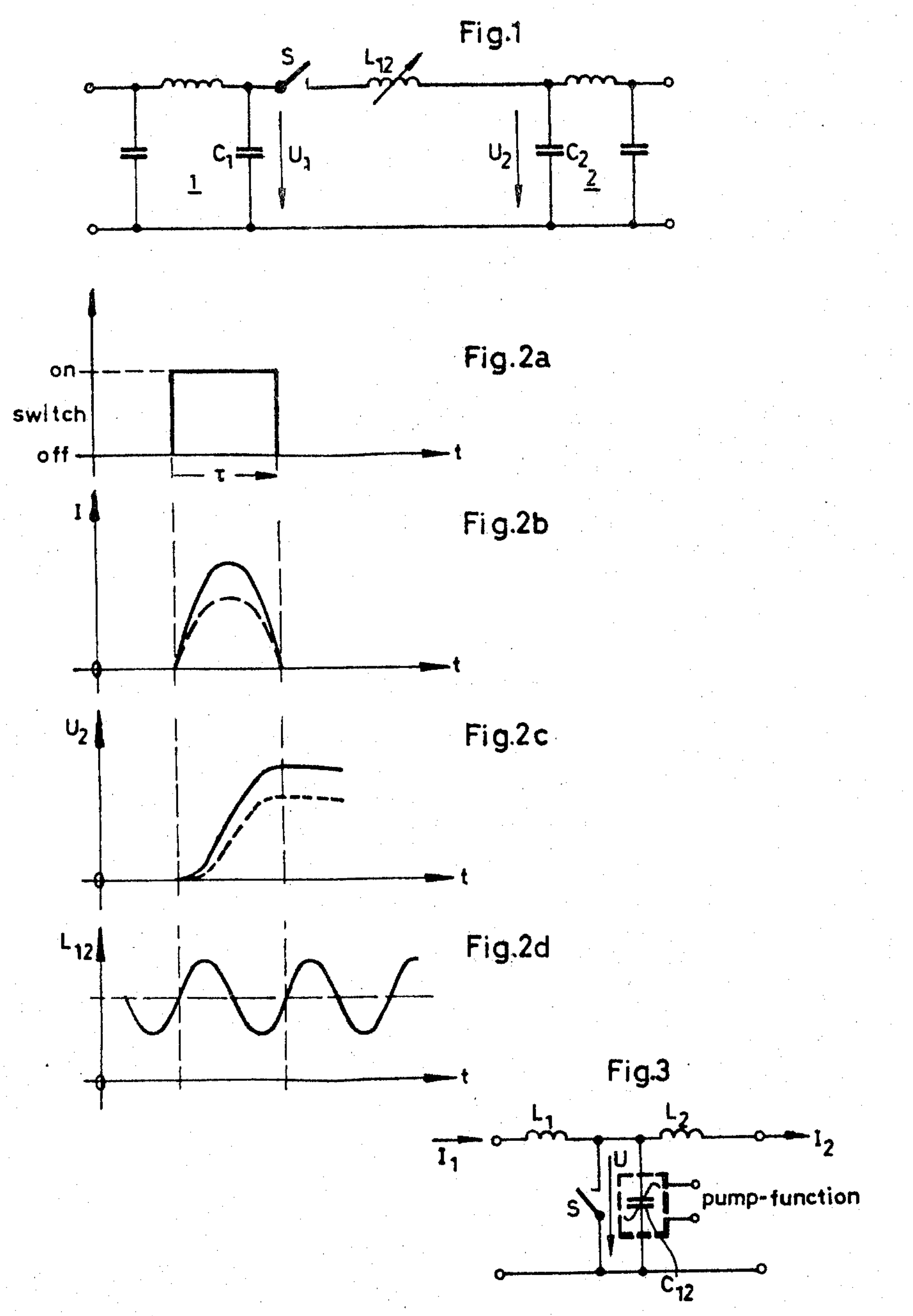
FIG. 3 represents a circuit in which the signal transfer switch is disposed in the transverse branch.

The amplifier indicated in FIG. 1 comprises a storer 1 formed as a low pass filter, at the terminal capacitance $C_1$ of which is to appear the signal voltage with the amplitude $U_1$ which is dependent upon time. This signal voltage $U_1$ is periodically sampled by means of a switch S, with a sampling frequency which amounts to at least twice the highest signal frequency. In order to obtain a substantially loss-free sampling, there is provided a transfer reactance which in the illustrated embodiments consists of an inductance $L_{12}$. In order to obtain a continuous signal voltage, the signal samples are extended to a second storer 2 which is likewise formed by a low pass filter. The input voltage of the storer 2 is indicated by $U_2$.

The inductance $L_{12}$ disposed in series with the switch S forms upon closure of the switch a resonance circuit the resonant frequency of which is at least approximately $\frac{1}{2}\tau$; $\tau$ indicates the closure time of the switch. The resonant frequency may also amount to a multiple of such value.

The inductance $L_{12}$ serving as transfer reactance is in the illustrated example provided for the purposes of parametic pumping. The manner in which such pumping is effected will be presently explained more in detail. The pump operation is indicated in FIG. 1 by representing the inductance $L_{12}$ as a variable inductance.

FIGS. 2*a* and 2*b* show the electrical and magnetic conditions in relation to time, considering only one sampling period, since the corresponding operation is analogously repeated in the case of the succeeding signal samples.

FIG. 2*a* indicates the closure operation of the switch S with respect to the time *t*. During the closure time $\tau$ of the switch, there will flow an equalization current I in the inductance $L_{12}$ (FIG. 2*b*; dash line), owing to the signal transfer from the storer 1 to the storer 2. The course of the equalization or compensation current corresponds to one-half sine period and would after a sine function continue and decay if the switch S would not be opened after the time $\tau$ or a multiple thereof.

The voltage $U_2$ attains its maximum value (dash line curve in FIG. 2$c$) at the instant of opening of the switch S. The voltage $U_2$ would remain at such value up to the next sampling; however, it is conducted to the load, by way of the low pass filter 2, and is there available as a continuous signal voltage, since the capacitor $C_2$ in the low pass filter, is discharged.

Upon changing now the value of the inductance $L_{12}$ during the time of closure of the switch S, such that a considerable inductance reduction is effected during the greatest current amplitudes, the amplitude of the current I will considerably increase. In the illustrated example, there is for this purpose provided an alteration (pumping) of the inductance in the rhythm of the sine oscillation, the period duration of which corresponds to the closure time $\tau$. This results in a course of the equalization or compensation current I corresponding to the full line curve shown in FIG. 2$b$, that is, the compensation current has a considerably greater maximum value. The maximum voltage appearing at $C_2$ is correspondingly increased, as indicated by the full line curve shown in FIG. 2$c$.

The described system makes it possible to obtain during a sampling interval a considerably higher amplification value. This will be realized upon considering that it is possible, either by appropriate selection of the sampling time $\tau$ or the resonant frequency of the sampling circuit comprising the storers 1 and 2 and the longitudinal inductance $L_{12}$, to provide conditions such that an odd number of half periods of the resonant frequency $f$ of the sampling circuit, differing from 1, falls into a closure interval $\tau$ of the switch, thus resulting, upon pumping during the entire closure interval $\tau$, in a considerable increase of the amplitude of the compensation current and therewith also of the voltage $U_2$. There is in such a case effected a repeated transfer (exchange) between the storers 1 and 2, a parametric amplification taking in view of the pumping place incident to each transfer operation.

The circuit shown in FIG. 3 contains a switch S in the transverse branch thereof. Instead of using transverse capacitances such as $C_1$ and $C_2$ (FIG. 1), there are provided longitudinal inductances $L_1$ and $L_2$ and a transverse capacitance $C_{12}$, disposed in parallel to the switch S, serves as a transfer reactance. The explanations made with respect to FIGS. 2$a$ to 2$d$ are directly applicable to the circuit according to FIG. 3 provided that the switch S in FIG. 2$a$ is opened during the time $\tau$ and otherwise closed, that is, exactly reverse from the operations effected in FIG. 1. Accordingly, the equalization voltage U appearing in the transverse branch is to be entered in FIG. 2$b$ instead of the equalization current I, the output current $I_2$ is to be entered in FIG. 2$c$ instead of the voltage $U_2$, and the transverse capacitance $C_{12}$ is to be entered in FIG. 2$d$ in place of the inductance $L_{12}$.

Figure 4:
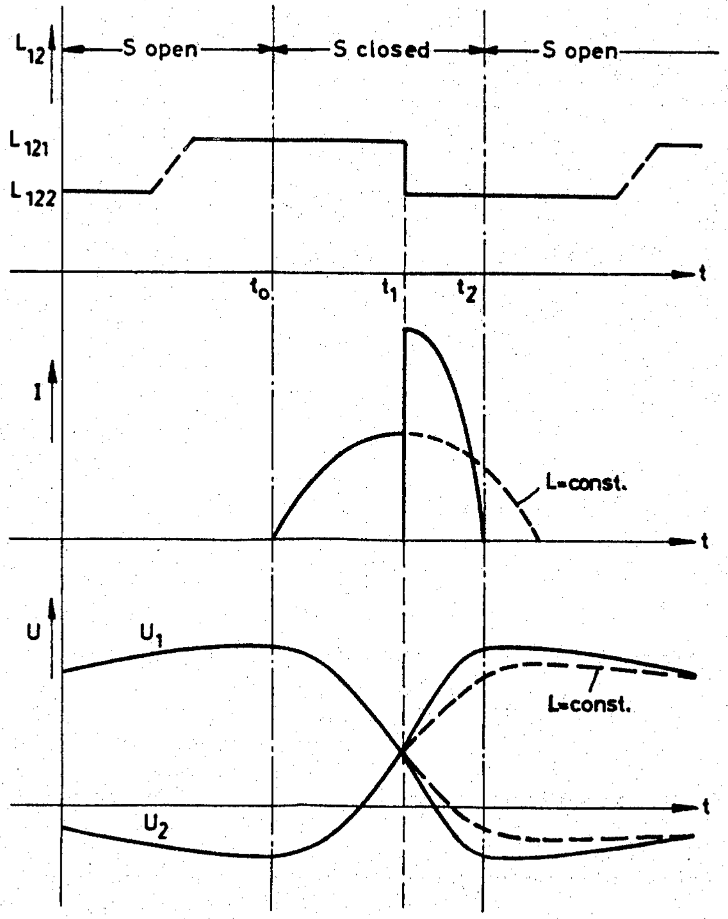
FIG. 4 illustrates the conditions which are to be provided in the event of a special, impulse-wise pumping.

The conditions to be provided in the event of a special, impulse-wise pumping, as shown in FIG. 4, refer to a circuit such as indicated in FIG. 1. The value of the inductance $L_{12}$ is thereby to be changed in leaps between the values $L_{121}$ and $L_{122}$. In the course of the charge transfer ($t_0$ to $t_2$) between the filter capacitances $C_1$ and $C_2$ (for example, $C_1=C_2=C$), the signal energy which is to be transmitted, is at the instant $t_1$ completely in $L_{12}$. The relation $$\left(t_1-t_0=\frac{\pi}{4}\cdot\sqrt{L_{12}}\cdot C/2\right)$$

applies for the time interval $t_1-t_0$. Upon reducing $L_{12}$, the value of which is to be $L_{121}$, to the value $L_{122}$, the intermediately stored signal energy will increase in a ratio $L_{121}/L_{122}$. The charge exchange is now continued with this increased signal energy up to the instant $t_2$, whereupon the switch S is opened and the transfer reactance $L_{12}$ thereupon brought again to the value $L_{121}$. For the time interval $t_2-t_0$ there applies the relation $$\left(t_2-t_0=\frac{\pi}{4}\sqrt{L_{121}}\cdot C/2+\sqrt{L_{122}}\cdot C/2\right)$$

A complete compensation (equalization) of the charge transfer (exchange) losses, and a switching through of the sampling four-terminal network, without attenuation, can be achieved by appropriate selection of the ratio $L_{121}/L_{122}$. A noticeable signal amplification, as explained in connection with the previously described example, can likewise be obtained.

Figure 5:
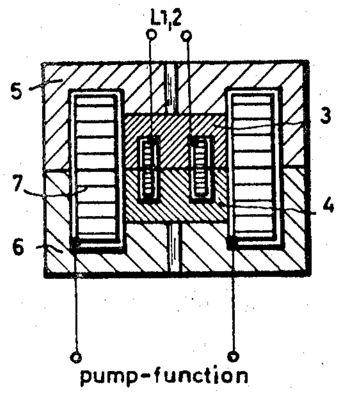
FIG. 5 shows an example of a variable inductance.

A coil having a ferrite core, the premagnetization of which is by means of a pump coil changed in the measure required is, for example, suitable to serve as a variable inductance. The use of shell cores without air gap is thereby primarily contemplated. FIG. 5 shows an example for such a variable inductance.

Referring now to FIG. 5, there is provided a coil within a first shell core of ferrite, comprising the half-shells 3 and 4. This coil, together with the shell core 3, 4, is to form the inductance $L_{12}$. The shell core 3, 4 is arranged within a larger shell core comprising the half-shells 5, 6, taking the place of the central web thereof. The shell core 5, 6 which can also be made of a ferrite, contains a further coil 7 serving for changing the magnetization of the shell core 5, 6. Each such change effects a change in the premagnetization of the shell core comprising the parts 3 and 4 and therewith a change in the inductance value of the coil $L_{12}$. Accordingly, the pump energy source is to be connected at the terminals of the further coil 7.

A device comprising a plurality of separate coils embedded at least partially in a magnetizable material such as ferrite, may be used in place of the arrangement shown in FIG. 5, a circuit example with two such separate coils being indicated in FIG. 6. In this circuit, the pump currents induced in the two windings of $L_{12}$, disposed between the terminals $a$ and $b$, are mutually cancelled, the circuit thus operating in the manner of a push-pull circuit. There then remains only the resultant inductance $L_{12}$, the value of which is altered by the pump energy.

The circuit example represented in FIG. 7 employs four such separate coils which are arranged in a bridge circuit. The pump energy is supplied to one diagonal branch, the inductance $L_{12}$ being available in the other diagonal branch.

It is in connection with the embodiments according to FIGS. 6 and 7 assumed that the individual coils are dimensioned so as to obtain respectively the desired push-pull or bridge circuit wherein practically no pump energy appears at the terminals for $L_{12}$.

Materials other than ferrite may be used for embedding the individual coils. For example, it is feasible, in the case of arrangements for very low frequencies to use instead of ferrite, transformer iron, preferably in laminated form. The coils can then be constructed in a manner similar to customary transformer or ring core coils. In connection with arangements for higher frequencies, it is contemplated to use as magnetizable material for the individual coils, for example, thin layers of permalloy, with a layer thickness in the order of magnitude of $10^{-4}$ millimeters, which are well adapted to serve as non-linear reactances such as are required for parametric amplifiers operating in the range of ultra short waves and decimeter waves. Such reactance may also be used as a transfer reactance as contemplated by the invention.

In the event that a capacitance is to be employed as transfer reactance, use may be made of the barrier layer capacitance of diodes, which is known to be adapted for such purposes. The manner of feeding the pump voltage to such barrier layer capacitances is sufficiently known from the techniques of parametic amplifiers and details with respect thereto can therefore be omitted since the known pump energy feed circuits for capacitance diodes is also adapted for the purposes of the circuit according to the invention. In order to avoid repetition, reference may also be made in this connection to the previously noted copending application, especially to the embodiment shown in FIG. 6 thereof.

Capacitors, the dielectric of which is dependent upon a bias voltage placed thereon, are likewise adapted for use as transfer reactances with non-linear capacitances, particularly in the range of relatively low frequencies. Capacitors having barium titanate as a dielectric may be noted to give an example. Such capacitors are commercially available, for example, in the form of disk capacitors. The circuitry is in such cases analogous to that applied when using diodes as variable capacitances.

The invention is of particular importance for the solution of amplification problems which are experienced in connection with telephone and the like communication systems. An example is represented in FIG. 8, showing a single-stage time-division multiplex connection.

Referring now to FIG. 8, the individual subscribers $TN_1$ to $TN_n$ are with the aid of storers, for example, low pass filters TP, transfer reactances, for example inductances $L_{12}$ and sampling switching $S_1$ to $S_n$, connectible with the common multiplex line ML. When a connection is to be established, for example, between $TN_1$ and $TN_n$, the sampling switches $S_1$ and $S_n$ are actuated synchronously, so as to effect synchronous closure and opening thereof. The losses occurring incident to the sampling and in the line system are at least partially compensated by the parametric amplification according to the invention. The individual transfer reactances $L_{12}$ are for this purpose pumped, as previously described, preferably by a common pump generator PG. The low pass filter TP which is provided for each subscriber line serves respectively as one of the two storers required for the amplification circuit. The amplification in the individual connection must be lower than the attenuation to which a signal which is extended from a subscriber station, for example $TN_1$, is subjected upon returning, by reflection in the transmission path, to the other subscriber line, for example, $TN_n$, to the original subscriber station $TN_1$ where it is reflected a second time in the direction of $TN_n$. As reflections of this kind, taking place in the transmission path, may be mentioned those which occur, for example, in the low pass filters, repeaters and the like.

A useful amplification value in customary systems of this kind, and considering the amplification of both parametic amplifiers in a connection extending, for example, between $TN_1$ and $TN_n$, lies at about 5–8 decibels.

The plural-stage system of this kind, indicated in FIG. 9, comprises again subscriber lines $Tl_1$–$Tl_n$. A parametric amplifier is provided in common for a plurality of subscriber lines.

Referring now to FIG. 9, in each subscriber line $Tl_1 \ldots Tl_n$ is inserted a low pass filter TP, similar to the storers 1 and 2 in FIG. 1, and in series with each low pass filter is disposed a switch such as $S_1 \ldots S_n$, corresponding respectively to the switch S in FIG. 1 and the switches $S_1$–$S_n$ in FIG. 8. A group multiplex line such as $GL_1 \ldots GL_n$ is respectively common to a plurality of subscriber line groups, the subscriber lines in each group being connected to the respective group multiplex line by way of a common transfer reactance $L_{12}$. Connections between the individual subscriber lines can be selectively established by way of intermediate multiplex lines LI and LII and if desired by way of further such intermediate multiplex lines, extending between the individual group multiplex lines $GL_1$ to $GL_n$. The pumping of the individual transfer reactances can be effected with the aid of a common pump generator PG, the pump line being indicated by a dash line.

The form of the amplitude curve of the pump voltage or the pump current, respectively, is freely selectible, provided that the conditions for the alterations of the transfer reactance are satisfied. There appears in practice, particularly in connection with systems according to FIGS. 8 and 9, the additional requirement of keeping the pump frequency as low as possible. This requirement can be advantageously in simple manner satisfied by the use of an inductance as a transfer reactance.

Assuming, for example, as shown in FIG. 10, that the sampling pulses have a duration of about 1 microsecond, with sampling pauses of the same duration, the parametric amplification can be obtained with a pump frequency of 250 kilocycles, provided that the allocation as to time, of the pump function, with respect to the sampling function, is so selected that the inductance minimum always appears at least in the second half of the individual sampling pulses, while the inductance maximum is restored at the latest at the start of the next following sampling pulse. It shall be considered in this connection, that when an alternating current of sufficient amplitude is fed to a coil which is at least partially embedded in a magnetizable material, there will occur, in the range of the maximum positive and negative current amplitudes, a saturation of the magnetization, which effects the desired inductance reduction.

On the basis of the foregoing description the terms "input signal storer," "transfer reactance" and "output signal storer" may be compared as follows. The input signal storer (such as indicated at 1 in FIG. 1) is capable of storing the value of an input signal (for example as the value of electric potential $U_1$ in FIG. 1). The output storer (such as indicated at 2 in FIG. 1) receives signal samples (for example as represented by the waveform of the electric potential $U_2$ indicated in FIG. 2*c*) from the input signal storer. The signal samples are transferred from the input storer to the output storer during transfer intervals (such as represented at $\tau$ in FIG. 2*a*). The duration of the transfer interval corresponds to the time during which an energy transfer path exists between the input and output signal storers. At the beginning of a transfer interval (for example at $t=t_0$ in FIG. 4) the signal value is present at the input storer (for example as represented by the value of $U_1$ in FIG. 4), while at the end of the transfer interval (for example at $t=t_2$ in FIG. 4) the signal value is present at the output storer (for example as represented by the value of $U_2$ at time $t_2$ in FIG. 4.)

During the transfer interval energy first builds up in a transfer reactance (such as indicated at $L_{12}$ in FIG. 1) and then decays again (this being represented by the curve of FIG. 2*b* representing the current variation during a transfer interval in transfer reactance $L_{12}$, FIG. 1, for example). Before the transfer interval, there is no signal energy in the transfer reactance ($I=0$ in FIG. 2*b*). At the end of the transfer interval, again there is no signal energy in the transfer reactance ($I=0$, FIG. 2*b*).

As previously stated with respect to FIG. 3, the curve of FIG. 2*b* may represent the voltage U appearing in the transverse branch in FIG. 3 (across capacitance $C_{12}$). Thus, for the embodiment of FIG. 3, before the transfer interval, the switch S is closed and the signal is represented by a value $I_1$ of current flow in inductor $L_1$. During the transfer interval switch S is open, and the potential U across capacitor $C_{12}$ first builds up and then decays again as represented by the curve of FIG. 2*b*. At the end of the transfer interval the signal is represented by a value $I_2$ of current flow in inductor $L_2$. As previously stated, the curve of FIG. 2*c* would represent the output current $I_2$ for the embodiment of FIG. 3. For the embodiment of FIG. 3, the transfer interval corresponds to the time when an energy transfer path exists between inductors $L_1$ and $L_2$.

In the seventh figure of the copending application Ser. No. 249,982, the storage reactance is pumped by means of an impulse function commencing prior to the closure of the energy transfer path and ending shortly after the transfer interval. The storage reactance in the copending application is thus pumped so as to increase the energy transferred therefrom in comparison to the signal energy established therein *prior to* the transfer operation. In a transfer reactance, the signal energy is momentarily established in the transfer reactance *during* the transfer operation, and the transfer reactance is pumped (for example as indicated at $t=t_1$ in FIG. 4) within the transfer interval.

Changes may be made within the scope and spirit of the appended claims which define what is believed to be new and desired to have protected by Letters Patent.

We claim:

1. An amplifier for electrical signal oscillations, comprising an input signal storer, an output signal storer, a line operatively connecting said storers for simultaneous signal transfer from one storer to the other, a resonant transfer means including a switch and a transfer reactance operatively disposed in said connecting line whereby the operative connection for the signal transfer from the one storer to the other is effected on the resonant transfer principle, in dependence upon the opening and closing of said switch, the latter being operable to transform the signal oscillations to be amplified into a succession of scanning pulses, whose sequence frequency is equal to at least twice the highest frequency of the signal, and means operatively connected with said transfer reactance for effecting a change in the reactance value thereof, in accordance with a pump frequency, during the time in which transfer is effected from one storer to the other as determined by said switch, to effect a parametric amplification of the signal oscillation so transferred.

2. An amplifier according to claim 1, comprising a four-terminal network for effecting the sampling operation, said sampling switch being disposed in the longitudinal branch of said four-terminal network in series with an inductance serving as the transfer reactance, and a separate magnetizing device for pumping said inductance.

3. An amplifier according to claim 1, comprising a four-terminal network for effecting the sampling operation, said sampling switch being disposed in the transverse branch of said four-terminal network in parallel with a capacitance serving as the transfer reactance, and a separate electrical control device for pumping said capacitance.

4. An amplifier according to claim 1, wherein the source of pump frequency is decoupled from the signal circuit.

5. An amplifier according to claim 1, wherein an impulse sequence is provided to serve as the source of pump frequency.

6. An amplifier according to claim 1, for use as an intermediate amplifier in the speech circuit of a time-division multiplex communication system, comprising a transfer reactance, circuit means for each subscriber line, including a storer in the form of a low pass filter and a sampling switch disposed in series with said transfer reactance, and means for connecting the respective circuit means with a multiplex line.

7. In a parametric amplifier for electrical signal oscillations which are to be parametrically amplified with the aid of a source of pump frequency, the combination of switch means for effecting a periodic sampling of said signal oscillations to produce a sequence of signals with a frequency which corresponds to at least twice the highest signal frequency, a transfer reactance cooperable with said switch means, when the latter is in sample-effecting operation, to effect substantially loss-free sampling of signals, and means for effecting a change in the reactance value of the transfer reactance, in accordance with said pump frequency during the periods of sampling to provide such parametric amplification.

8. A signal transfer circuit comprising a first storer, a second storer, a transfer reactance, means for transferring at periodic times a stored charge in said first storer simultaneously to said transfer reactance and said second storer, and means for controlling the reactance value of said transfer reactance in accordance with a pump frequency during the periodic times.

References Cited

UNITED STATES PATENTS

| | | | |
|---|---|---|---|
| 3,149,205 | 9/1964 | Ravanesi | 179—15 |
| 3,205,310 | 9/1965 | Schlichte | 179 |
| 3,061,681 | 10/1962 | Richards | 179—15 |

ROBERT L. GRIFFIN, *Primary Examiner.*

JOHN W. CALDWELL, DAVID G. REDINBAUGH, *Examiners.*

J. T. STRATMAN, *Assistant Examiner.*